Sept. 3, 1940.　　　　C. S. DRAKE　　　　2,213,694
RAKE
Filed Nov. 12, 1938
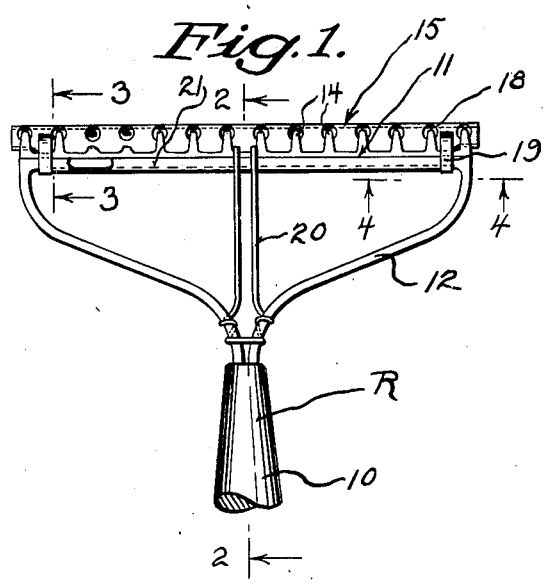
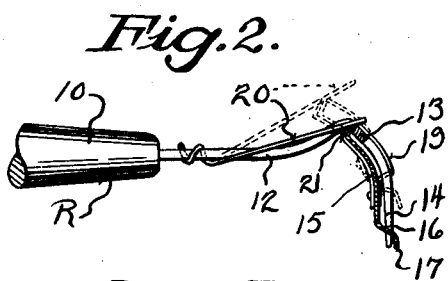
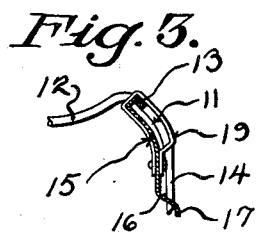
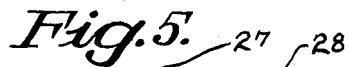
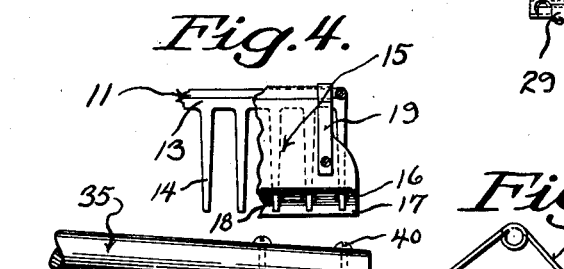
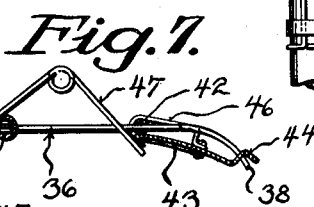
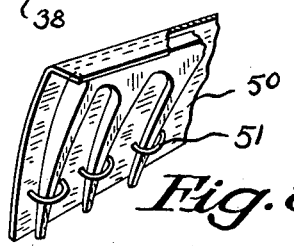
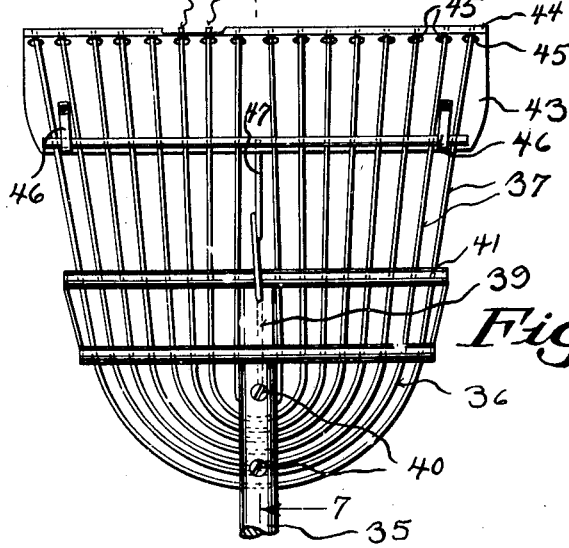
Inventor
Clarke S. Drake
By
Attorneys Patented Sept. 3, 1940

2,213,694

UNITED STATES PATENT OFFICE 2,213,694

RAKE

Clarke S. Drake, Milwaukee, Wis., assignor of one-half to George J. Weigle, Milwaukee, Wis.

Application November 12, 1938, Serial No. 240,089

2 Claims. (Cl. 56—400.08)

This invention appertains to rakes and similar implements, and more particularly to a novel attachment for pronged or toothed devices for facilitating the effective use thereof.

One of the primary objects of my invention is to provide means for automatically clearing the rake during its use, whereby to eliminate the necessity of constantly cleaning the teeth thereof by hand.

Another salient object of my invention is to provide a self-cleaning rake embodying a movable cleaning plate, so constructed and arranged as to form a guard for the rake, whereby to limit the insertion of the rake teeth in the ground to prevent injury to grass and other plant roots, and to prevent the passing of loose material, such as sticks, stones, acorns, and the like between the teeth of the rake.

A further object of my invention is to provide a self-cleaning rake having a movable cleaning plate thereon normally held in a lowered cleaning position by gravity or spring tension, the plate being adapted to move above the top of the rake, when the rake is being forced down into or over the ground or turf, so that material will be prevented from riding over the upper edge of the rake.

A still further object of my invention is to provide a guard plate for automatically cleaning the teeth of a rake, which is so constructed that the same can be easily and quickly incorporated with conventional rakes at a small cost.

With these and other objects in view, the invention consists in the novel construction, arrangement, and formation of parts, as will be hereinafter more specifically described, claimed, and illustrated in the accompanying drawing, in which drawing:

Figure 1 is a fragmentary, top plan view of a rake, showing my novel cleaning attachment incorporated therewith, parts of the attachment being shown broken away and in section.

Figure 2 is a detail, sectional view taken on the line 2—2 of Figure 1, looking in the direction of the arrows, showing the cleaning device in its lowered position in full lines, and in its raised position in dotted lines.

Figure 3 is a view similar to Figure 2, but taken on the line 3—3 of Figure 1, looking in the direction of the arrows.

Figure 4 is a fragmentary, longitudinal, sectional view taken substantially on the line 4—4 of Figure 1, looking in the direction of the arrows, illustrating the novel cleaning plate.

Figure 5 is a detail, fragmentary, top, plan view illustrating the novel means employed for connecting the rake-cleaning appliance with a rake of the type embodying a central attaching shank.

Figure 6 is a fragmentary, top plan view showing the novel means of incorporating my cleaning appliance with a rake of the "broom" type.

Figure 7 is a detail, sectional view taken on the line 7—7 of Figure 6, looking in the direction of the arrows, illustrating the novel means for mounting the cleaning plate upon the wire prongs or teeth of the "broom" rake.

Figure 8 is a detail, fragmentary, perspective view illustrating one means for mounting the cleaning plate on the outer surface of the rake head.

Referring to the drawing in detail, wherein similar reference characters designate corresponding parts throughout the several views, the letter R indicates a rake of the type embodying a manipulating handle 10 and a rake head 11. The rake head 11 is connected by means of a substantially U-shaped yoke with the handle 10. The rake head 11 may include a longitudinally extending bar 13 having a plurality of depending, arcuate, spaced, parallel teeth 14. The rake, thus described, is of the ordinary or conventional construction and forms no part of my present invention, but has merely been shown for the purpose of illustrating the application of my invention.

My invention comprises a novel cleaning and guard plate 15, which extends longitudinally along the rake head. In the present instance, the plate 15 has been shown on the inside of the rake head, but it is to be understood that the same can be placed on the outside of the rake head without departing from the spirit or the scope of my invention.

The plate is preferably curved transversely, as is clearly shown in Figures 2 and 3, so as to conform to the curvature of the rake teeth, and the plate is adapted to slide back and forth on the rake head. The extreme lower end of the plate 15 is built into a substantial S-shape, and thus includes a forwardly extending flange 16 and a depending lip 17. Rake teeth openings 18 are formed in the flange 16, and the rake teeth 14 extend through said openings. Obviously, during the sliding of the plate on the teeth, the plate will function to push material impaled on the teeth off the same.

Any desired means can be provided for guiding the plate 15 during its sliding movement, and for the purpose of illustration I have shown the plate provided with elongated guide brackets formed from strap metal 19. These straps 19 are riveted or otherwise secured to the plate 15 adjacent the opposite ends of the plate and extend about the top rake head bar 13.

The weight of the plate will normally tend to hold the plate in a lowered position, as shown in Figures 2 and 3. However, any desired type of spring device can be employed for positively holding the plate in its lowered position. In the form shown in Figures 1, 2, and 3, I provide a wire tension spring 20, and this spring can be bent around the yoke 12 of the rake head, and can then be brought forwardly over the top edge of the plate 15. I prefer to provide the top edge of the plate 15 with a forwardly extending rib 21, which is adapted to engage the top of the rake head and limit the downward movement of the plate.

Obviously, during the raking operation, the plate 15 will ride up on the rake teeth a greater or lesser distance depending upon the pressure placed upon the rake teeth and the distance the rake teeth move into the ground. As soon as the rake head is raised, the plate will lower and effectively clean the teeth.

During the raking process, the plate prevents loose material, such as stones, acorns, and the like from passing between the teeth of the rake, and, thus, the efficiency of the rake is materially increased. Likewise, the rake head can carry a greater load, as when the plate slides upwardly on the rake head, material will be prevented from riding over the top edge of the rake head.

While I have inferred that the rake is to be used for garden or lawn purposes, it is to be understood that the rake can be successfully used in industrial work, in which instance the plate serves as an effective means for moving material, both when the rake is being pushed and when being pulled.

In Figure 5, I have shown my device applied to a rake embodying a centrally disposed shank 25. The shank is anchored in the manipulating handle 26 in the ordinary way, and the rake includes the usual head 27 having depending teeth 28. The guard plate is slidably mounted upon the rake head, and is guided in its movements by the brackets 29. A wire spring 30 is employed for engaging the top of the plate in order to normally urge the plate downward. The spring 30 can be secured to the handle 26 in any desired manner, and, as illustrated, the rear end of the spring is coiled about the handle, as at 31, and a cuff 32 is employed for securely holding the spring to the handle.

In Figures 6 and 7, I have shown my novel appliance incorporated with rakes of the so-called "broom" type. This type of rake includes a plurality of resilient wire teeth, and the rake is used like a broom for sweeping grass and leaves from the lawn. As illustrated, the rake shown in Figures 6 and 7 includes a manipulating handle 35 and a rake head 36. The rake head 36 includes a plurality of resilient wire strands 37, the outer ends of which may be curved downwardly to form the rake teeth 38. These wire strands 37 can be anchored to the handle 35 in a number of different manners, and in the present instance, the wire strands are bent to form U-shaped structures, and the bight portions of the U-shaped structures are clamped between plates 39, which are, in turn, securely bolted, as at 40, to the handle. The wire strands 37 are braced at spaced points by transversely extending metal strips 41. I mount rigidly on the wire strands 37 a cross-bar 42, and this cross-bar serves as a support for the cleaning plate 43.

The cleaning plate is of substantially the same construction as the cleaning and guard plates heretofore described, and, hence, the forward edge of the plate is curved, as at 44, and apertured, as at 45, to receive the strands. The plate also has riveted or otherwise secured thereto the guide brackets 46, which engage about the cross-rod 42. These brackets guide the plate during its sliding movement. A wire tension spring 47 is provided for normally urging the plate 43 forwardly to its cleaning position, and the rear end of the spring is anchored to one of the clamping plates 39 by means of one of the retaining bolts 40. During the use of the rake the plate 43 will move backward on the teeth by material engaging the same, as the rake is drawn over the ground. When the rake is lifted, the spring will force the plate forward on the teeth 38 and effectively remove all debris from the teeth.

In all the forms of my invention I have shown the rake teeth extending through openings in the cleaning plate. This is not necessary, and in some instances may not be advisable. Thus, the plate can be provided with a metal strap having loops formed therein and engaging about the individual teeth, or, as illustrated in Figure 8, a guard plate 50 can be provided with wire loops 51 for engaging about the rake teeth. In this figure, the plate 50 is also shown on the outer face of the rake head.

Other changes in details may be made without departing from the spirit or the scope of my invention.

The advantages of my device have been described in some detail, but it is apparent that other uses and advantages of my appliance will readily suggest themselves to persons familiar with the use of rakes.

What I claim as new is:

1. A rake comprising, a handle, and a rake head secured to the handle including a plurality of teeth, and a guard plate for the rake head extending longitudinally of the rake head engaging the inner face thereof, said guard plate being slidable back and forth on the rake head, a forwardly and downwardly extending flange on the forward lower edge of the plate having a plurality of openings therein for slidably receiving the teeth, a depending lip on the forward edge of the flange for engaging the outer surface of the teeth and the ground during the movement of the rake over the ground, and a forwardly extending top rib on the upper edge of the plate adapted to engage the top of the rake head for limiting forward downward movement of the plate on the rake head, and guide means on said plate for engaging the rake head and holding the plate slidable thereon.

2. As a new article of manufacture, an attachment for rake heads for bringing about the self-cleaning thereof comprising, a solid plate having spaced forwardly projecting members on its upper and lower edges, said member on the lower edge being provided with openings for receiving the rake teeth and constituting a cleaning member, and said upper member constituting a stop for engaging the top of the rake head, a depending ground-engaging lip formed on the forward edge of the lower member, and means carried by the plate for connecting the plate with a rake head.

CLARKE S. DRAKE.